(12) United States Patent
Kouroussis et al.

(10) Patent No.: US 9,800,087 B2
(45) Date of Patent: Oct. 24, 2017

(54) MULTI-LEVEL DATA CENTER CONSOLIDATED POWER CONTROL

(71) Applicant: Virtual Power Systems, Inc., Santa Clara, CA (US)

(72) Inventors: Denis Kouroussis, Toronto (CA); Rajeev P Huralikoppi, Sunnyvale, CA (US); Ryan Justin Kennedy, Charlotte, NC (US); Erich Karl Nachbar, Foster City, CA (US); Shankar Ramamurthy, Saratoga, CA (US); Pranthik Samal, Santa Clara, CA (US); Rajaram Soundararajan, Cupertino, CA (US); Andrew Sy, Fremont, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 500 days.

(21) Appl. No.: 14/525,799

(22) Filed: Oct. 28, 2014

(65) Prior Publication Data

US 2015/0115711 A1 Apr. 30, 2015

Related U.S. Application Data

(60) Provisional application No. 61/896,504, filed on Oct. 28, 2013, provisional application No. 61/931,667, (Continued)

(51) Int. Cl.
*H02J 9/06* (2006.01)
*G06F 1/26* (2006.01)
(Continued)

(52) U.S. Cl.
CPC .............. *H02J 9/061* (2013.01); *G06F 1/263* (2013.01); *G06F 1/30* (2013.01); *G06F 1/3206* (2013.01);
(Continued)

(58) Field of Classification Search
CPC ...... H02J 1/00; H02J 3/38; H02J 9/005; H02J 9/06; H02J 9/062; H02J 9/061; H02J 7/34;
(Continued)

(56) References Cited

U.S. PATENT DOCUMENTS 6,396,170 B1 5/2002 Laufenberg et al.
6,967,283 B2 * 11/2005 Rasmussen ............. G06F 1/189
174/50

(Continued)

FOREIGN PATENT DOCUMENTS

EP 2372861 B1 10/2011
JP 2009232521 A 10/2009

(Continued)

OTHER PUBLICATIONS

International Search Report dated Feb. 9, 2015 for PCT/US2014/062650.

(Continued)

*Primary Examiner* — Ryan Johnson
(74) *Attorney, Agent, or Firm* — Adams Intellex, PLC

(57) ABSTRACT

Multi-level data center consolidated power is disclosed. One or more controllers communicate with one or more power supplies and sensors to adapt to dynamic load requirements and to distribute DC-power efficiently across multiple IT racks. The distributed DC-power includes one or more DC-voltages. Batteries can be temporarily switched into a power supply circuit to supplement the power supply during spikes in power load demand while a controller reconfigures power supplies to meet the new demand. In embodiments, one or more DC-to-AC converters handle legacy power loads. The DC-to-AC converters are modular and are paralleled for redundancy. The AC-power is synchronized for correct power flow control. The one or more controllers (Continued)

communicate with the one or more AC-power supplies to dynamically allocate AC-power from the DC-to-AC converters to the multiple IT racks.

36 Claims, 9 Drawing Sheets

Related U.S. Application Data filed on Jan. 26, 2014, provisional application No. 61/970,390, filed on Mar. 26, 2014, provisional application No. 61/985,617, filed on Apr. 29, 2014, provisional application No. 62/029,226, filed on Jul. 25, 2014, provisional application No. 62/033,618, filed on Aug. 5, 2014, provisional application No. 62/047,593, filed on Sep. 8, 2014, provisional application No. 62/057,127, filed on Sep. 29, 2014.

(51) Int. Cl.
*G06F 1/30* (2006.01)
*G06F 1/32* (2006.01)
*H02J 7/00* (2006.01)

(52) U.S. Cl.
CPC ............ *H02J 7/0063* (2013.01); *H02J 9/062* (2013.01); *H02J 2007/0067* (2013.01); *Y10T 307/344* (2015.04)

(58) Field of Classification Search
CPC .. H05K 7/1492; H05K 7/1498; G06F 1/3206; G06F 1/3287; G06F 1/26; G06F 11/2015; G06F 11/3062; Y02B 60/1278; Y10T 307/344; Y10T 307/549
See application file for complete search history.

(56) References Cited

U.S. PATENT DOCUMENTS

| | | | |
|---|---|---|---|
| 7,236,896 B2 | 6/2007 | Farkas et al. | |
| 8,193,662 B1* | 6/2012 | Carlson | H02J 9/061 307/23 |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,958,923 B2* | 2/2015 | Kake | H02J 3/38 700/286 |
| 9,641,025 B2* | 5/2017 | Agrawal | H02J 9/061 |
| 2005/0071092 A1 | 3/2005 | Farkas et al. | |
| 2005/0162019 A1 | 7/2005 | Masciarelli et al. | |
| 2007/0216229 A1 | 9/2007 | Johnson, Jr. et al. | |
| 2007/0229024 A1* | 10/2007 | Li | G06F 1/305 320/111 |
| 2008/0320322 A1* | 12/2008 | Green | G06F 1/26 713/340 |
| 2010/0037070 A1 | 2/2010 | Brumley et al. | |
| 2010/0058092 A1 | 3/2010 | Bougaev et al. | |
| 2010/0205469 A1 | 8/2010 | McCarthy et al. | |
| 2010/0211810 A1 | 8/2010 | Nacho | |
| 2010/0328849 A1 | 12/2010 | Ewing et al. | |
| 2011/0133559 A1 | 6/2011 | Yamashita et al. | |
| 2011/0264937 A1 | 10/2011 | Meisner et al. | |
| 2011/0302432 A1 | 12/2011 | Harris et al. | |
| 2012/0054512 A1 | 3/2012 | Archibald et al. | |
| 2012/0066519 A1 | 3/2012 | Ei-Essawy et al. | |
| 2015/0180233 A1* | 6/2015 | Yamada | H02J 1/08 307/23 |
| 2016/0209901 A1* | 7/2016 | Wilcox | H05K 7/1492 |

FOREIGN PATENT DOCUMENTS

| | | |
|---|---|---|
| WO | WO2011119444 A2 | 9/2011 |
| WO | WO2012091323 A2 | 7/2012 |

OTHER PUBLICATIONS

International Search Report dated Jan. 30, 2015 for PCT/US2014/062684.
Metcalf, Jeffrey, "Power Efficiency Comparison: Cisco UCS® 5108 Blade Server Chassis and HP BladeSystem® c7000 Enclosure", Copyright Sep. 2013, Cisco.
"VMware® Distributed Power Management Concepts and Use", White Paper, Copyright 2010 VMware, Inc., 3401 Hillview Avenue Palo Alto CA 94304 USA.
Mammano, Bob, "Load Sharing with Paralleled Power Supplies", Copyright 2001, Texas Instruments Incorporated, Dallas, Texas.
Muccini, Mark, el al., "Power Consumption Reduction: Hot Spare", A Dell technical white paper, Feb. 2012, Rev. 1.0, Dell, Inc.
Meisner, David, Brian T. Gold, and Thomas F. Wenisch. "PowerNap: eliminating server idle power." ACM SIGARCH Computer Architecture News 37.1 (2009): 205-216.

\* cited by examiner

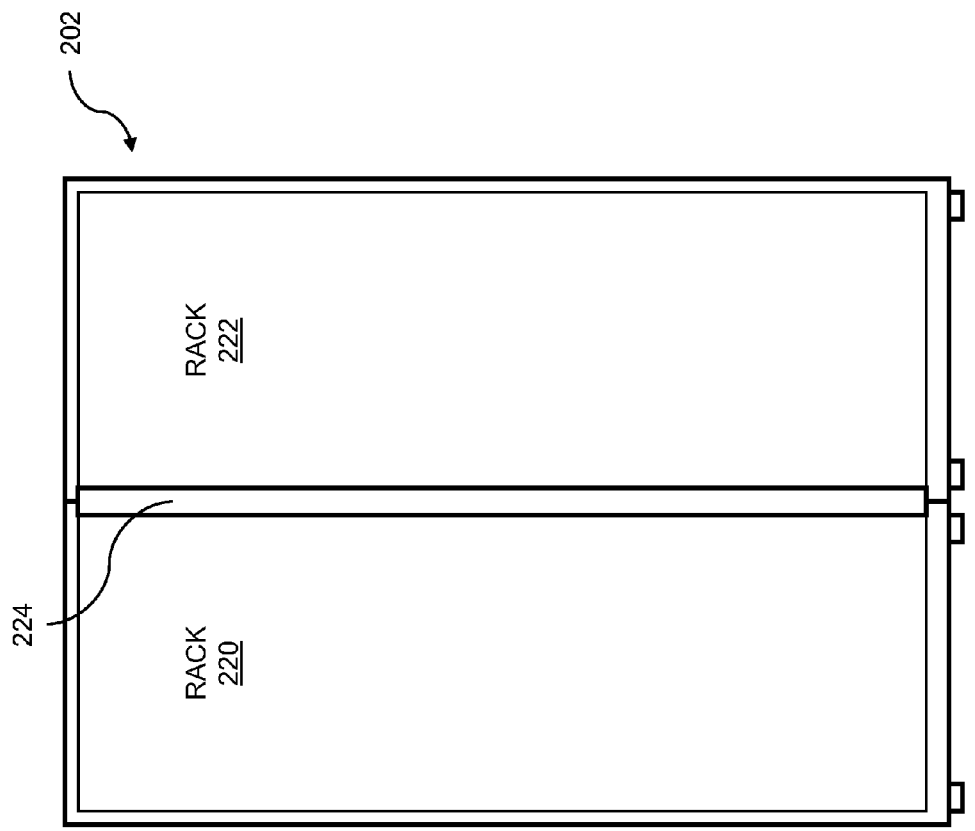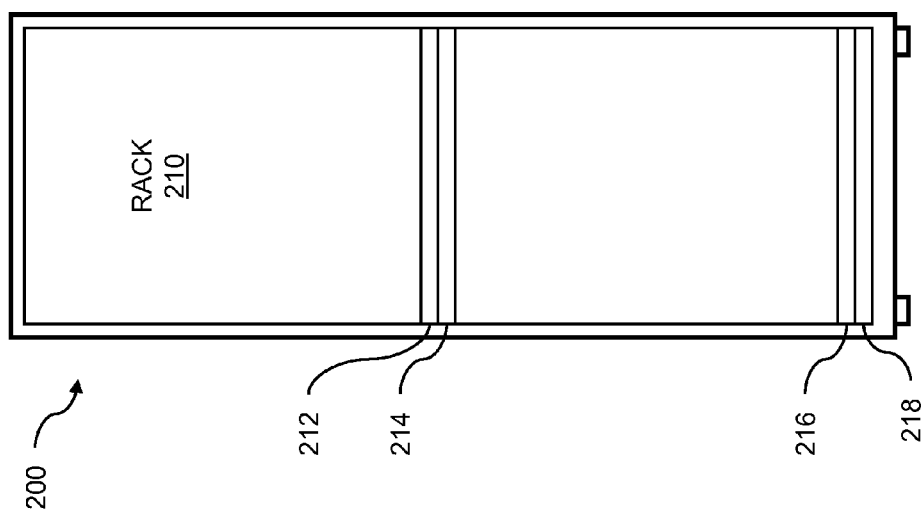
FIG. 2

MULTI-LEVEL DATA CENTER CONSOLIDATED POWER CONTROL

RELATED APPLICATIONS

This application claims the benefit of U.S. provisional patent applications "Intelligent Control of Energy and Power Management" Ser. No. 61/896,504, filed Oct. 28, 2013, "Intelligent Power Control" Ser. No. 61/931,667, filed Jan. 26, 2014, "Dynamic Power Control Through Resource Allocation" Ser. No. 61/970,390, filed Mar. 26, 2014, "Dynamic Power Capacity Allocation" Ser. No. 61/985,617, filed Apr. 29, 2014, "Multi-Level Data Center Consolidated Power Control" Ser. No. 62/029,226, filed Jul. 25, 2014, "Multi-Level Dynamic Power Control Through Capacity Allocation" Ser. No. 62/033,618, filed Aug. 5, 2014, "Energy Control Via Power Requirement Analysis and Power Source Enablement" Ser. No. 62/047,593, filed Sep. 8, 2014, and "Intelligent Control Of Energy For Rack Level Consolidated Power Systems" Ser. No. 62/057,127, filed Sep. 29, 2014. The foregoing applications are each hereby incorporated by reference in their entirety.

FIELD OF ART

This application relates generally to power supplies and more particularly to rack level consolidated power.

BACKGROUND

Various entities, such as search providers, on-line retailers, financial institutions, research laboratories, universities, and other computing-intensive organizations often conduct operations from large scale computing facilities, sometimes referred to as data centers or, more colloquially, "server farms." Such computing facilities house a large number of servers along with network and computer equipment to process, store, and exchange data as needed to execute desired functionality. Such functionality typically includes the storage, processing, and retrieval of data. Typically, such a server farm includes many server racks. In some cases, there can be hundreds, or even thousands of racks. Each server rack, in turn, includes many servers and other associated computer equipment.

Computer systems typically include a number of components that consume power. Such components include printed circuit boards, mass storage devices, networking interfaces, and processors. Given the precise and ever-rising power requirements demanded by these components, reliable and efficient power delivery is crucial for successful operation of such server farms. Additionally, in some cases the reliability and availability requirements of the data center infrastructure must meet or exceed predetermined statutory requirements, as demonstrated by many financial institutions, for example. Further, as is the case for financial institutions as well as healthcare organizations, educational organizations, and retail organizations, other statutory requirements demand certain standards be met to ensure the protection of personal customer data. The statutory requirements often place stringent safeguards on the physical and technical security of personal data.

Because of issues such as availability, reliability, job load, and other organizational requirements of data centers, additional infrastructure requirements must be met. For example, the issue of effectively cooling a data center (i.e. the removal of excess heat) is a critical issue which must be addressed to ensure stable and reliable operation of the center. Each of the many devices in the data center generates substantial amounts of heat, whether the device is a server, a blade, a switch, a backup unit, a communications unit, or another device. In fact, the issue of cooling modern data centers has become such an important design criterion that it directly impacts the layout and design of the center. For example, some data centers are arranged in so called "hot rows" and "cold rows," where equipment generating excess heat is grouped together in "hot rows" and surrounded by rows of cooler-running equipment grouped in "cold rows," named for their ability to serve as heat sinks, absorbing some of the excess heat from the "hot" equipment. Other centers are designed with cooling devices placed directly adjacent to particularly hot devices, with the cooling devices including fans, air conditioning units, water cooling systems, and so on. Another significant data center design consideration involves providing sufficient power to the data center. Particularly in the case of high-reliability data centers, power can be provided by more than one power grid to provide redundancy, while for other data centers, power can be provided by a combination of a power grid and locally generated power. Regardless of how the power is provided to the data center, providing reliable and efficient power to the large number of computers and associated equipment in modern data centers or server farms is an important aspect of successful operation of such facilities.

SUMMARY

The power demands for a data center or server farm are typically dynamic in nature. For example, power requirements can increase during normal business hours, and subsequently decrease after hours and/or on weekends. Additionally, the schedule for various batch jobs can affect power demands. Disclosed embodiments provide an apparatus for power control suitable for use in a data center environment. Multiple smart power supplies and batteries are connected together to provide power control for equipment in multiple racks. Multiple DC-to-AC converters provide power control for racked equipment requiring AC power. Power is configured to be controlled and shared across racks. Power is redistributed across the racks as needed to accommodate dynamically changing power needs. In some instances, less critical functions can be deprioritized, allowing a brief disruption or brownout to occur on less critical functions in order to provide uninterrupted and stable power for highly critical functions. Controllers are configured to communicate with a variety of sensors, including load sensors and power sensors, and then react to changes in power demand to provide stable, reliable power to the equipment in the racks. The controllers monitor conditions for faults, and invoke a failure policy in the event a fault is detected. The failure policy can include a switchover from a failed power supply to a functioning power supply, a switchover from a power supply to a battery, a switchover from a failed DC-to-AC converter to a functioning DC-to-AC converter, a shutdown of equipment, and/or a sending of a notification of the failure event to other automated systems and/or facility personnel. Thus, embodiments provide data center monitoring solutions that can detect potential problems before they cause damage. The early detection provides additional time to take action to prevent or minimize downtime. An apparatus for power control is disclosed comprising: one or more batteries; one or more power supplies; one or more DC-to-AC converters; a plurality of connectors between the one or more batteries, the one or more power supplies, and the one or more DC-to-AC converters where the connectors provide power to one or more loads; a plurality of power sensors coupled to the one or more batteries and the one or more power supplies; a plurality of load sensors coupled to the one or more loads; and one or more controllers that control the one or more batteries, the one or more power supplies, and the one or more DC-to-AC converters, where the controllers are responsive to the plurality of power sensors and the plurality of load sensors, and enable the one or more batteries, the one or more power supplies, and the one or more DC-to-AC converters to provide adequate power to the one or more loads in order to meet load requirements, and wherein the one or more batteries are configured to handle spikes in power demand by the one or more loads during a duration or time where the one or more power supplies do not provide sufficient power. In embodiments, a module is included that determines capabilities of the one or more power supplies. In some embodiments, a module is included that determines power requirements for the load.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 2 shows example rack and power configurations.

DETAILED DESCRIPTION

Figure 1:
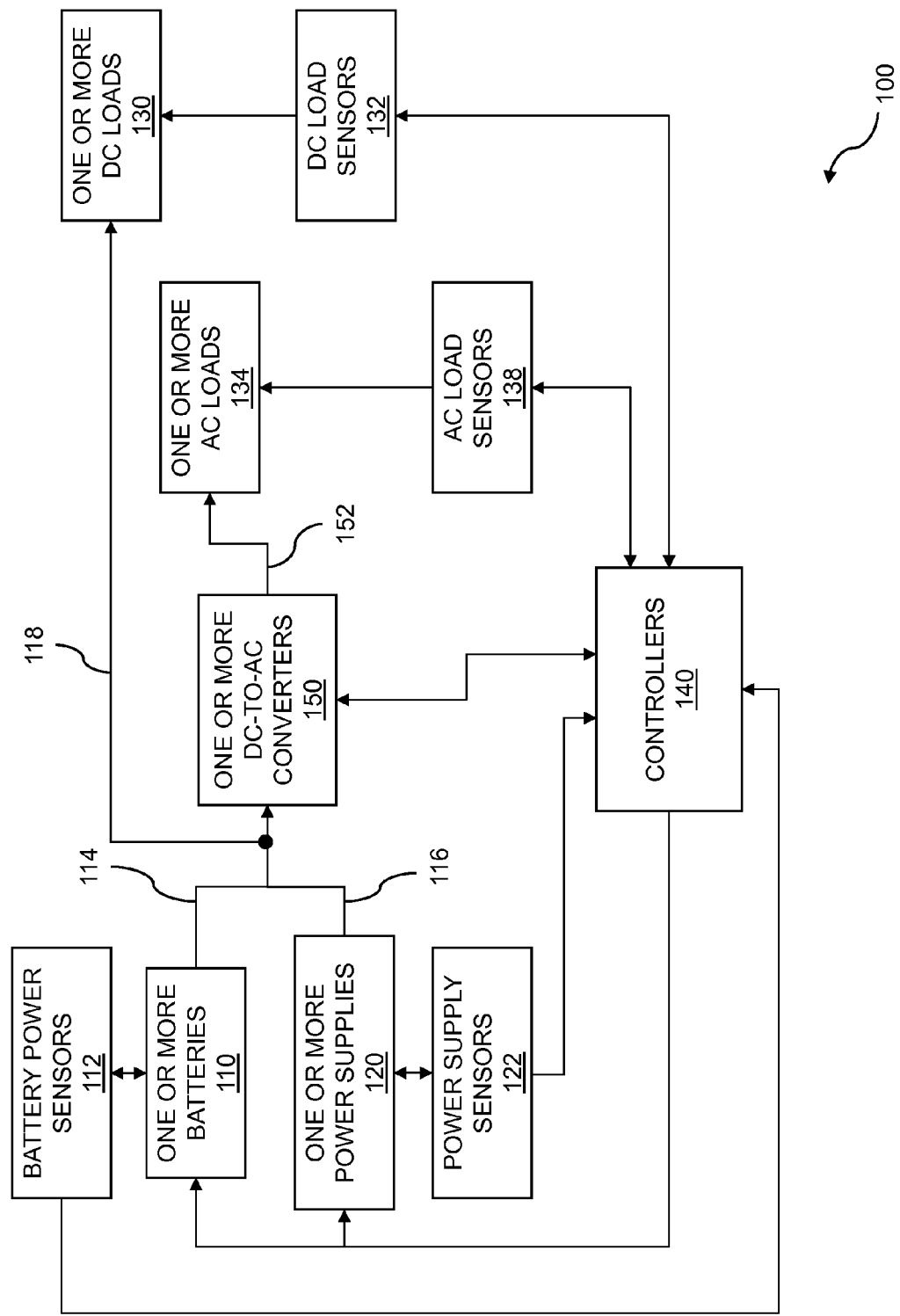
FIG. 1 shows a block diagram for power control.

Data centers, server farms, and other IT processing centers typically utilize standardized racks for the compact mounting of servers, blade components, storage arrays, network interfaces, and other associated equipment. Disclosed embodiments provide distributed power across racks, using one or more controllers to coordinate power from multiple smart power supplies, multiple batteries, and multiple DC-to-AC converters. The smart power supplies are configured to communicate with the controller(s) to provide operating conditions for the smart power supplies to the controllers and receive commands from the controllers specifying real-time changes in needed power, for example. In some embodiments, power is provided to legacy systems which operate at voltages other than those provided by the power supplies. To meet the power requirements of the legacy systems, DC-to-AC power streams can be connected in order to convert current at the power supply and battery voltages to the voltages of the legacy equipment, for example. Thus, in some circumstances, power supplies and controllers in one rack dynamically provide power to components installed in a different rack. Similarly, in other circumstances, DC-to-AC converters in one rack dynamically provide power at legacy voltages to components installed in a different rack. In some embodiments, the dynamic power adjustment involves adding and removing batteries from the power circuit as needed to maintain a stable power output. Side-mounted controllers can be included in the setup, such that the controllers are arranged on their side with the long axis oriented vertically, and placed between two neighboring racks. In addition to dynamically distributing and controlling power to the various racks, data from sensors and the smart power supplies are monitored to detect faults. A failure policy is invoked upon detection of a failure or fault. The failure policy can include, but is not limited to, a switchover operation, a shutdown operation, and/or a notification operation.

The IT infrastructure devices that require power in a data center can include servers, blade servers, storage systems, backup systems, switches, telephony systems, security systems, and so on. The devices are typically housed in racks, with the racks usually installed in rows in the data center. Traditionally, power sources for the devices and systems in the racks have been installed within or adjacent to the racks that they power. As a function of the specialized power source installation, power control is usually performed at the individual device or system level. That is, in current implementations, the power sources handle only the equipment in the racks in which the power sources themselves are installed, with each power source often under the control of an individual vendor's proprietary system. In addition, in current systems, power loads cannot be evenly distributed across two or more phases of AC mains power, across power supplies, and across batteries, for example. The lack of distribution capacity can result in data centers with some racks receiving excessive power and other racks receiving inadequate power. The disclosed concepts provide improved reliability, efficiency, fault detection, and response capabilities, resulting in more efficient operation of data centers and server farms. The concepts also provide for elastic power allocation to meet needs across a data center or group of data centers. The needs to be met can include providing power to CPU nodes, virtual machine processes, storage systems, and network systems.

Another approach to populating a data center involves colocation of IT infrastructure equipment belonging to multiple enterprises into one data center. Such an approach is popular with small to midsized enterprises including Internet companies, for example, because the colocation allows the enterprises to focus their IT staff on corporate objectives rather than on infrastructure support. Colocation of equipment in the data center includes dividing the data center logically and/or physically into rentable partitions or "cages." The rentable partitions can be physical partitions such as lockable racks, cages, partitioned (walled) spaces, and so on. An enterprise can locate the various components of its IT infrastructure within a partition, including servers, blade servers, storage systems, etc. The benefits of colocation of IT infrastructure to the enterprise include cost reduction due to economies of scale, higher system reliability (e.g. uptime), system redundancy (heating, cooling, power [DC, AC], network, fire suppression, etc.), shared IT, shared engineering and other staff, improved physical security, and so on.

FIG. 1 shows a block diagram of an apparatus 100 for implementing power control. The apparatus 100 includes one or more batteries 110. The batteries 110 can include, but are not limited to, lead-acid batteries, gel-cells, lithium-ion batteries, nickel-cadmium batteries, nickel metal-hydride batteries, or other suitable technology. In some embodiments, the batteries 110 are smart batteries that include capabilities such as an internal voltage monitoring circuit, an internal temperature monitoring circuit, and so on. The apparatus 100 includes one or more power supplies 120. The one or more power supplies can be smart power supplies, and can include the capability of reporting parameters including, but not limited to, output voltage, output current, operating temperature, duration of operation, and health status. In the apparatus shown 100, a plurality of battery power sensors 112 are coupled to the one or more batteries 110 and a plurality of power supply sensors 122 are coupled to the one or more power supplies 120. The apparatus 100 also includes a plurality of connectors a connector 114 and another connector 116 in the example shown to provide coupling between the one or more batteries 110 and the one or more power supplies 120. The connector 114 and the other connector 116 further provide power to one or more DC loads 130 through a third connector 118. Similarly, the connector 114 and the other connector 116 can provide power to one or more DC-to-AC converters 150. The apparatus shown 100 includes a connector such as connector 152, which in embodiments provides power to the one or more AC loads 134 from the one or more DC-to-AC converters 150. In embodiments, the one or more batteries 110 and the one or more power supplies 120 provide power to the one or more DC loads 130. In some embodiments, the one or more DC-to-AC converters 150 provide power to the one or more AC loads 134. In some embodiments, a plurality of DC-to-AC converters is configured to provide three-phase AC power. The DC loads 130 can include rack-mounted servers, storage arrays, network interfaces, monitoring equipment, and cooling systems, for example. The AC loads can include legacy equipment including servers, rack-mounted servers, storage arrays, network interfaces, and so on, devices which in embodiments operate on 208-volts AC (VAC), for example. The apparatus 100 includes a plurality of DC load sensors 132 coupled to the one or more DC loads 130 and a plurality of AC load sensors 138 coupled to the one or more AC loads 134. The DC load sensors 132 are configured to provide instantaneous current requirements of the one or more DC loads 130. The AC load sensors 138 are configured to provide instantaneous current requirements of the one or more AC loads 134.

The apparatus 100 includes one or more controllers 140 that control the one or more batteries 110, the one or more power supplies 120, and the one or more DC-to-AC converters 150, where the controllers respond to the plurality of power sensors such as the battery power sensors 112 and the power supply sensors 122, and the plurality of DC load sensors 132 and the plurality of AC load sensors 138. The controllers 140 can enable the one or more batteries 110, the one or more power supplies 120, and the one or more DC-to-AC converters 150 to provide adequate power to the one or more DC loads 130 and to the one or more AC loads 134, respectively. Additionally the one or more batteries 110 can be configured to handle spikes in power demand caused by the one or more DC loads 130 during a duration where the one or more power supplies do not provide sufficient power to meet DC load requirements. Continuing, the one or more batteries 110 can be configured to handle increased power demands of the one or more DC-to-AC converters due to spikes in the power demands of the AC loads. The one or more power supplies 120 can provide a substantially 12-volt DC power but numerous other voltages, either DC or AC, can be provided without departing from the disclosed concepts. In embodiments, the one or more power supplies 120 can be used to provide a substantially 48-volt DC power or other required DC power. A DC-to-DC converter can produce the substantially 48-volt DC power from various sources, including from the substantially 12-volt DC power of the one or more power supplies in some embodiments. In other embodiments, the one or more power supplies 120 can provide other appropriate DC voltages. The one or more DC-to-AC converters 150 can provide an AC voltage appropriate to the one or more loads. The AC loads can be caused by the presence of legacy equipment, for example. The one or more DC-to-AC converters can provide the same AC voltages or can provide different AC voltages as needed by the one or more loads. The one or more DC-to-AC converters 150 can provide a substantially 208-volt AC power.

The controllers 140 can contain one or more processors or microcontrollers, input/output (IO) functions, network interfaces, and user interfaces that can include front panel buttons, liquid crystal display (LCD) screens, and/or other suitable user interface mechanisms. The controllers 140 can be augmented or further controlled from cloud facilities. The control 140 can calculate a number of necessary power supplies and DC-to-AC converters. The calculation of necessary power supplies and DC-to-AC converters can be performed by querying the DC load sensors 132 and the AC load sensors 138 to determine the DC and AC power requirements. The controllers can query the one or more power supplies 120 to determine the capabilities of each power supply, and thus are able to calculate a number of power supplies necessary for a given DC load requirement. The controllers can query the one or more DC-to-AC converters 150 to determine the capabilities of each DC-to-AC converter, and are able to calculate the number of DC-to-AC converters necessary for a given AC load requirement. The controllers can include a microcontroller capable of sensing voltage and current, and controlling the power supplies, batteries, and DC-to-AC converters. Embedded software finning on the microcontroller can be developed specifically to run the power supplies in such a way as to maximize the time spent by each power supply in the most efficient part of its energy efficiency curve, thus ensuring optimal or near optimal usage.

For example, in a scenario where a rack includes multiple servers that are currently idle, the power requirements might be 12 volts with a current draw of 2.1 amperes. If a query arrives that the servers need to process, multiple previously idle processor cores within the server start to consume more power in response to the query. As a result, the current draw might suddenly increase to 2.9 amperes. Thus, for a given duration, the power supplies can prove unable to meet the power demand of the load with the given duration being a function of dynamic power requirements. The duration where the one or more power supplies do not provide sufficient power can be a time duration during which the controllers trigger the one or more power supplies to provide more power.

The controllers 140 are coupled to the DC load sensors 132 and to the AC load sensors 138, and detect the increased DC power and AC power demands. The controllers 140 can then utilize switches and/or relays to switch on the one or more batteries 110 in order to maintain the 12-volt output and supply the needed DC current to the DC loads. Similarly, the controllers 140 can utilize switches and/or relays to switch on the one or more batteries 110 to the DC-to-AC converters 150 in order to support the required current to the AC loads. In embodiments, the relays include DPDT relays. The controller 140 then communicates with the one or more power supplies 120 to increase output of the power supplies 120 and/or to bring additional power supplies 120 online to meet the increased DC power demand. The controller 140 also then communicates with the one or more DC-to-AC converters 150 to increase output of the DC-to-AC converters 150 and/or to bring additional DC-to-AC converters online to meet the increased AC power demand. Once the power supplies 120 are supplying the needed DC power and the DC-to-AC converters are supplying the needed AC power, the batteries 110 are no longer needed to supply the additional power and can be switched out of the circuit and/or placed into a recharging mode to be ready for the next time such an increase occurs. In embodiments, the battery operation can be enabled or disabled using a microcontroller within the controller 140. Similarly, the controller 140 can communicate with the one or more DC-to-AC converters 150 to increase the output of the DC-to-AC converters 150 (i.e. to increase current) and/or to bring additional DC-to-AC converters 150 online to meet the increased power demand.

The controllers 140 can be configured, in the event of a failure in a controller, to directly couple the power source to the DC load 130. In embodiments, a hardware failsafe system is used in order to ensure that if a controller 140 fails, the power supplies 120 and the DC-to-AC converters 150 remain on and continuously provide power to the DC loads 130 and the AC loads 134 respectively. In embodiments, the hardware failsafe system includes one or more relays that are coupled to one or more signals provided by the one or more controllers 140. In the event of a controller failure, the absence of such a signal triggers an operation by which the relays provide a direct path for power from the power supplies 120 to the DC loads 130 and the DC-to-AC converters 150 to the AC loads 134 in order to render the reliability of the power to the loads independent of the reliability of the one or more controllers 140. In embodiments, multiple batteries are pooled and connected in parallel to provide required power at the output.

Upon failure of a controller 140, control of the one or more batteries 110, the one or more power supplies 120, and the one or more DC-to-AC converters can be transferred to a second controller. In embodiments, a periodic handshake, a so-called heartbeat mechanism, is employed, such that each controller is aware of the status of other controllers. For example, in a scenario with two controllers 140 where each controller is responsible for controlling two power supplies, the first controller and second controller periodically initiate a handshake sequence where the first controller sends a message to the second controller and awaits an acknowledgement from the second controller and vice versa. If the second controller sends a message to the first controller but the first controller does not acknowledge receipt, for example, a failure of the first controller can be determined. That is, after a predetermined time-out period (e.g. 200 milliseconds) the second controller can divert control of the first controller's power supplies to the second controller. In this way, distribution of power continues to be controlled by the second controller until the first controller can be repaired or replaced. Thus, the one or more controllers 140 can comprise a plurality of controllers and the plurality of controllers can provide for redundancy of operation within the plurality of controllers so that the one or more batteries 110 and the one or more power supplies 120 continue to provide adequate power to the one or more DC loads 130 and the one or more DC-to-AC converters 150 continue to provide adequate AC power to the one or more AC loads 134.

The controllers 140 can be configured to enter a default mode upon startup. In embodiments, the default mode places all power supplies 120 in an ON configuration. The one or more power supplies 120 can initialize to a 12-volt DC setting upon initial connection. In other embodiments, the default mode places all DC-to-AC converters 150 in an ON configuration. The one or more DC-to-AC converters 150 can initialize to a 208-volt AC setting upon initial connection. Once the controllers 140 assess current load requirements via the DC load sensors 132 and the AC load sensors 138, the controllers can allow one or more of the power supplies 120 and one or more of the DC-to-AC converters to be switched off or have output reduced in order to save energy. Since power supplies generate heat, there are also heat savings in addition to energy savings. Typically a data center or server farm has an extensive cooling system to maintain an optimal operating temperature for the equipment. Given the power consumption of a large cooling system, additional savings can be achieved if the system does not have to operate at as high a level in order to achieve the desired ambient temperature, as is the case in the example given due to the reduced heat output of the power supplies 120 operated by the controllers 140. The controllers 140 can be housed separately from the one or more batteries 110, the one or more power supplies 120, and the one or more DC-to-AC converters 150. In embodiments, the one or more batteries 110, the one or more power supplies 120, the one or more DC-to-AC converters 150, the plurality of connectors 114, 116, 118, and 152, the plurality of power sensors 112 and 122, the plurality of DC load sensors 132 and AC load sensors 138, and the controllers 140 can be housed in a 1U (one rack unit) enclosure and mounted in a rack. The one or more batteries 110, the one or more power supplies 120, the one or more DC-to-AC converters 150, the plurality of connectors 114, 116, 118, and 152, the plurality of power sensors 112 and 122, the plurality of DC load sensors 132 and AC load sensors 138, and the controllers 140 can provide power for a data center rack (e.g. rack 210 of FIG. 2).

The apparatus 100 can further include a module that determines the capabilities of the one or more power supplies 120 and the one or more DC-to-AC converters 150. In embodiments, the one or more controllers 140 utilize a communications protocol such as the Standard Commands for Programmable Instruments (SCPI), IEEE-488 (GPIB), or another suitable protocol. Associated commands can include interrogating the power supplies 120 and the DC-to-AC converters 150 for maximum voltage and current capabilities, cycle rate, total kilowatt hours provided, maximum operational duration, time in service (how long the power supply or the DC-to-AC converter has been operating since it came online), ambient temperature requirements, battery conditions, and other various parameters. The apparatus 100 can further comprise network connectivity for the one or more power supplies 120, the one or more DC-to-AC converters 150, the plurality of power sensors 112, the plurality of DC load sensors 132 and AC load sensors 138, and/or the controllers 140.

The apparatus 100 can further comprise a module that determines power requirements for the DC load 130 and the AC load 134. Power requirements of the power loads operating at a given time are detected. Based on the detecting of the load power requirements, one or more power supplies and one or more DC-to-AC converters are enabled to match the power requirements of the one or more DC loads 130 and the one or more AC loads 134, respectively. In embodiments, the power requirements are detected by querying one or more of the power supplies 120 and the one or more DC-to-AC converters 150 to retrieve the output voltage and current parameters.

The controllers 140 can perform a detection using the plurality of power supply sensors 124 to determine that certain units of the one or more power supplies and certain units of the one or more DC-to-AC converters are not controllable by the central controller. Attempting to query the power supply or the DC-to-AC converter can trigger the execution of the detection. This query can occur, for example, in a scenario where an older power supply is swapped in for a smart power supply on a temporary basis to allow delivery of power while the smart power supply is repaired. In such a scenario, it might be preferable to use an unreachable power supply (one that is not controllable by the controller) on a temporary basis until the unreachable power supply can be replaced with a smart power supply.

The controllers 140 can invoke a failure policy based on the detection. Example failure policies include sending a diagnostics message to another monitoring system and/or to data center personnel and shutting down the load that is connected to the unreachable power supply or the unreachable DC-to-AC converter. The controllers 140 can perform a detection using the plurality of battery power sensors 112 to determine if certain batteries of the one or more batteries 110 are at a low voltage. In some embodiments, the one or more batteries 110 have integrated voltage sensors. Batteries that quickly revert to a low voltage condition after being charged can trigger a signal flagging the batteries for replacement. In response to the detection, a diagnostics message can be sent to another monitoring system and/or to data center personnel to indicate that one or more batteries need replacement. In embodiments, the controllers 140 are further configured to detect a faulty battery charger.

The controllers 140 can evaluate the potential power capabilities of the one or more power supplies 120 and the power requirements of the load, determine that the power requirements of the load exceed the power capabilities of the one or more power supplies 120, and couple the one or more batteries 110 to the load to supply additionally needed power. Connecting one or more batteries to the load and selecting additional power supplies for connection to the load can help meet dynamic spikes in load power requirements. After batteries cover immediate spikes in system demand, additional power supplies can be enabled to the loads and the batteries which provided the power for spikes in energy demand can be disabled from the loads. When the power demand of the loads is reduced, one or more power supplies can be disabled from the loads. The one or more loads 130 can include a plurality of sub loads. In embodiments, the sub loads include cards within a rack or other peripherals connected to a rack-mounted piece of equipment.

FIG. 2 shows two example rack and power configurations, a first configuration 200 and a second configuration 202. The one or more batteries, the one or more power supplies, the plurality of connectors, the plurality of power sensors, the plurality of load sensors, and the controllers can comprise a consolidated rack mount power system. An example system is shown in the first configuration 200 which includes rack 210, in turn composed of consolidated rack mount power systems 212, 214, 216, and 218. The one or more batteries, the one or more power supplies, the plurality of connectors, the plurality of power sensors, the plurality of load sensors, and the controllers can comprise a consolidated side mount power system. An example setup is shown in the second configuration 202 which includes a first rack 220 and a second rack 222, together composing a consolidated side mount power system 224 placed between a rack 220 and another rack 222. The consolidated rack mount power system and the consolidated side mount power system can be stackable. For example, consolidated rack mount power systems 212 and 214 are stacked on one another in adjacent rack spaces.

The stacking can provide for N+ parallelization. N+ parallelization refers to a number of additional power supplies beyond the required number which are kept as standby or reserve power supplies. For example, if a particular cluster of racks requires six power supplies, an N+1 configuration would provide seven power supplies, an N+2 configuration would provide eight power supplies, and so on. The stacking can also provide for 2N parallelization. Again using the example of six required power supplies, a 2N parallelization scheme would provide 12 power supplies. In the 2N redundancy configuration, any critical path in the power system is replicated to remove single points of failure and increase robustness. The consolidated side mount power system can also provide power across multiple racks. For example, a single consolidated side mount power system 224 can provide power across a first rack 220 and a second rack 222.

Figure 3:
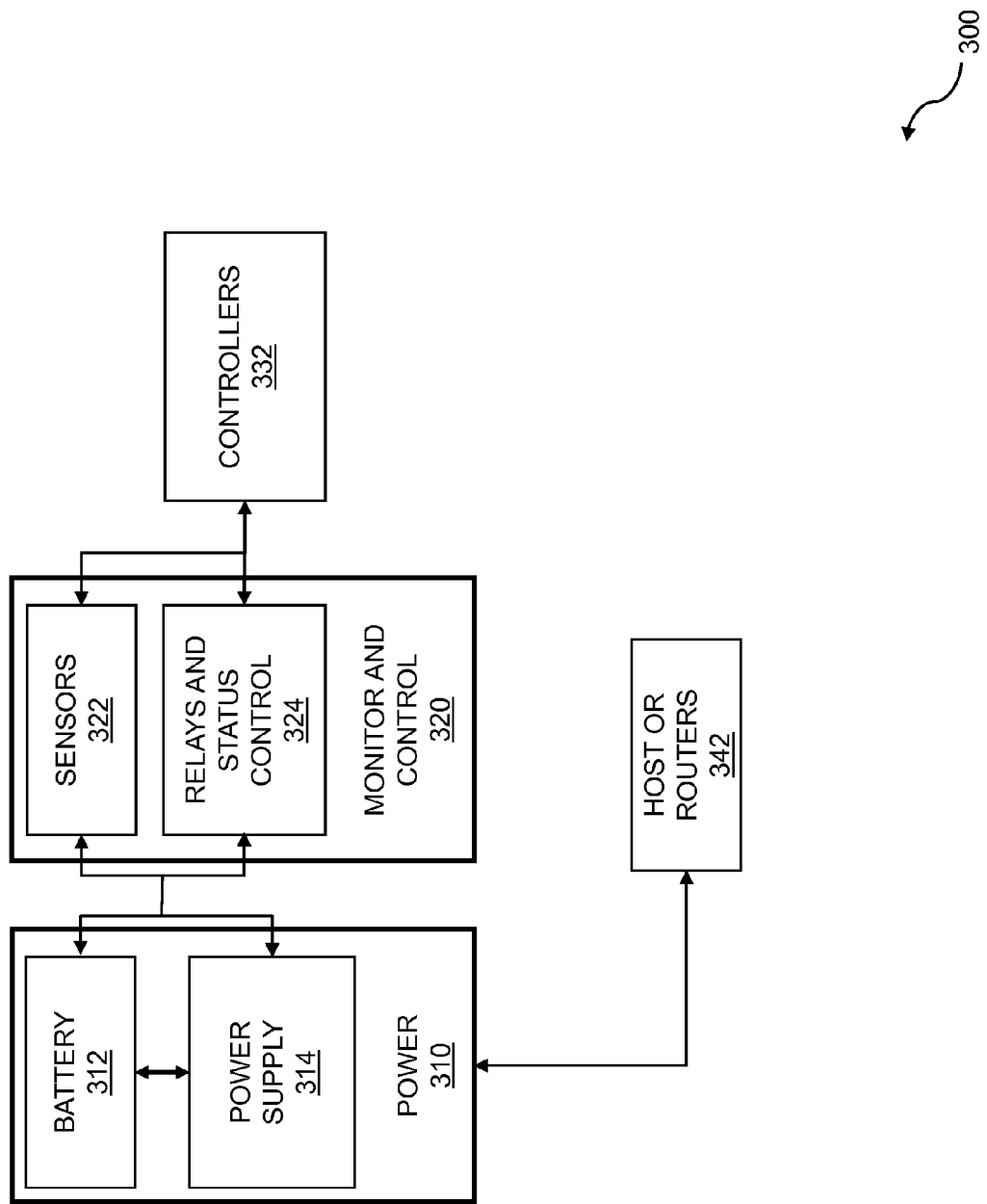
FIG. 3 is a diagram of power supplies and sensors.

FIG. 3 is a diagram of power supplies and sensors. The system 300 comprises on or more controllers 332. The one or more controllers 332 are configured and disposed to communicate with a monitor and control module 320. The monitor and control module 320 includes sensors 322 along with a relays and status control unit 324. The sensors 322 can include, but are not limited to, battery sensors, power supply sensors, temperature sensors, humidity sensors, and/or vibration sensors. The relays and status control unit 324 can be accessed via a protocol such as the Standard Commands for Programmable Instruments (SCPI), IEEE-488 (GPIB), Ethernet, programmable I/O, I2C (Inter-integrated Circuit), analog-to-digital converters (ADC), or another suitable mechanism. The relays can totally isolate and disconnect power supplies from the AC input when applicable. In the example shown, the monitor and control module 320 is configured to communicate with a power module 310. The power module 310 includes a battery 312 and a power supply 314. The monitor and control module 320 is configured and disposed to retrieve data from the power supply 314 and the battery 312. The retrieved data can include, but is not limited to, output voltage, output current, operating temperature, battery life, duration of operation, operating efficiency, and output frequency. In embodiments, the monitor and control module 320 performs a wear-leveling process on a plurality of power supplies based on a duration of operation measurement for each of the plurality. For example, consider a configuration where, during normal operation, four power supplies provide the power to the racks while a fifth power supply is provided for redundancy but normally remains in a standby state. The fifth power supply is typically left unused. However, the controllers 332 can rotate the use of the power supplies to even power supply usage, and thus to ensure even wear.

The one or more controllers 332 can couple power sources from the batteries 312 and the power supplies 314 to the loads, based on power redundancy requirements of the one or more loads. The redundancy requirements can be automatically detected based on information obtained from the plurality of power sensors 322, the plurality of load sensors, the one or more power supplies 314, and the one or more batteries 312. The controllers 332 can perform a detection, using the plurality of power sensors 322, to determine that current or voltage readings from a plurality of power supplies 314 differ in excess of a certain threshold number from a specified current or voltage value. The controllers 332 can invoke a failure policy based on the detection. The failure policy can include disabling or shutting down one or more loads connected to the power supplies. The failure policy can further include transmission of diagnostic and/or status messages to a host or routers 342. The controllers 332 can be configured and disposed to send status messages to a host or routers 342 via a wired or wireless network. In embodiments, the network includes Internet access. In embodiments, the diagnostic and/or status messages include sending e-mails and/or text messages to data center personnel and status reporting via SNMP or other suitable protocol. The host can render a graphical representation of the operating conditions of the power supplies. The representation can include charts indicating power supply trends over a recent time period as well as any failure conditions present on the system. Power supply trends over a recent time period can be used to analyze trends in power usage for the data center.

The controllers 332 can determine a default mode and a failsafe mode. In embodiments, the default mode specifies that the power supplies default to the ON position. The failsafe mode can specify that the power supplies shut down or remain active depending on the scenario. For example, if a controller 332 fails, the failsafe mode can be configured so the power supplies continue to provide power to keep the data center components operational even if the enhanced power control capabilities provided by the controller are not available.

Figure 4:
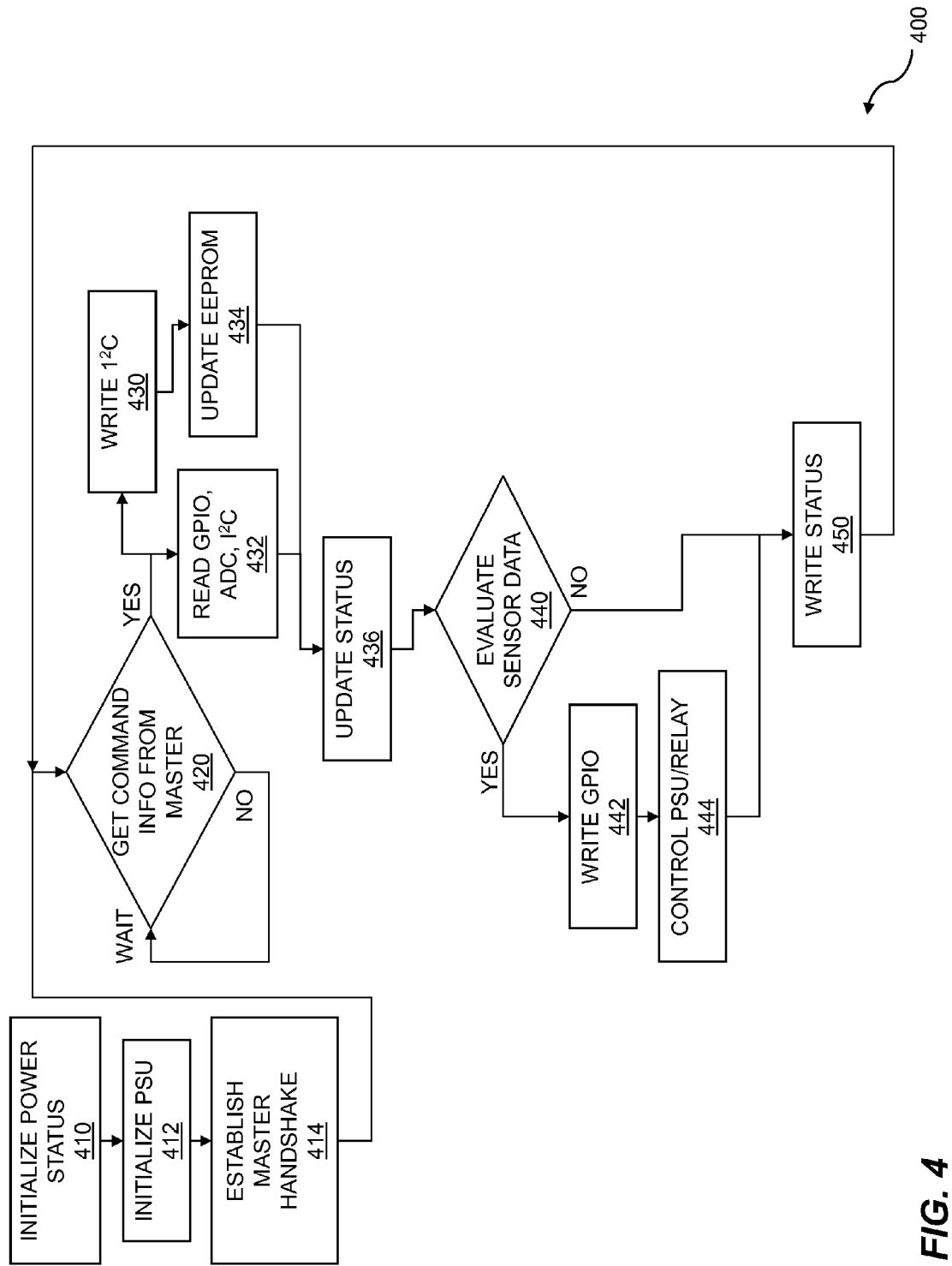
FIG. 4 is an example flow diagram for control software.

FIG. 4 is an example flow diagram for control software. The flow 400 starts with initializing power status 410. The initializing can include enabling sensors, configuring relays, and performing system health checks and other functions prior to turning on the power supplies. The flow 400 continues with initializing power supply units 412. This initializing can include setting the power supplies to a default mode, which can be the ON position so that the power supply is supplying power to a rack. The flow 400 continues with establishing a master handshake 414. In embodiments, the handshake includes communication between a controller and a power supply. The communication initiated by the handshake can include sending power supply capabilities and status to the controller. The flow 400 continues with getting command information from the master 420. In embodiments, the power supply goes into a "listen" mode and awaits a command from the controller. Once a command is received, the flow continues with one of writing I2C 430 and reading GPIO (General-purpose input/output), ADC and/or I2C 432. Optionally, non-volatile memory can be updated by updating EEPROM (Electrically Erasable Programmable Read-Only Memory) 434. In some embodiments, another persistent storage mechanism is used instead of or in addition to EEPROM, such as flash memory, battery-backed SRAM, or the like. The parameters stored in non-volatile memory can include last-known operating conditions and power settings. Additionally, a running event log can be stored in the non-volatile memory. The running event log can include a timestamp indicating a time and date for each event. The events can include a record of a current or voltage fluctuation that exceeds a predetermined threshold, an instance where battery power was used to supplement the power supply, low voltage warnings, communication errors, and instances when battery power was removed from the power supply. An exemplary log is shown below:

May-31-2014-11:42:04.422 - Battery L1 supplemented Power Supply HX220C

-continued

May-31-2014-11:42:04.514 - Power Supply HX220C - increase current to 2.9A
May-31-2014-11:42:05.970 - Battery L1 supplement removed from Power Supply HX220C
Jun-02-2014-04:23:05.364 - Battery L2, low voltage warning 10.4V
Jun-05-2014-04:23:05.364 - Lost communication In embodiments, each power supply and battery within the system is assigned an identifier, so that events can be correlated to a particular unit. The identifier can be user-defined or can be derived from factory data such as serial numbers, mac addresses, or other unique identifiers. For example, the first line of the log shown above indicates that power supply HX220C used supplemental battery power from battery L1 on May 31, 2014 at 11:42:04.422. The next event shows a reconfiguration of power supply HX220C to increase the supplied current. Then, the next event, at 1.548 seconds after the first event, indicates that the battery L1 supplement was removed from Power Supply HX220C, meaning that the power supply HX220C was then able to supply the needed power without battery assistance.

The flow continues with updating a status 436. The updated status can reflect the use of batteries to supplement the power supplies, sensor status, and failure conditions. The flow 400 continues with evaluation of sensor data 440. The evaluation can include evaluation of load sensors, battery power sensors, and power supply sensors. In response to the sensor data, the flow can continue with writing general purpose input output (GPIO) 442, and controlling power supplies and/or relays 444. In embodiments, the flow then continues to writing a status 450 to update the system with the results of the changes. If the results of the evaluation of sensor data 440 do not require any system adjustments, the flow can directly continue to writing a status 450 to reflect that sensor data was evaluated. The flow can then return to a waiting state awaiting command information from the master 420.

Figure 5:
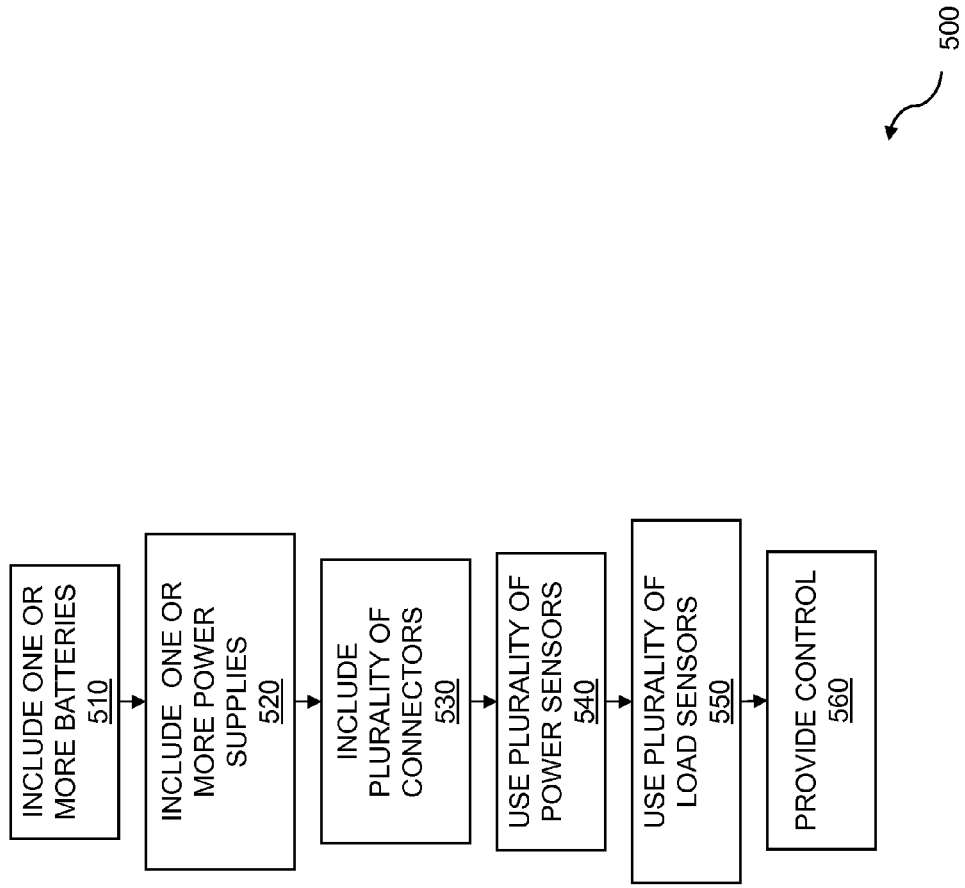
FIG. 5 is a flow diagram for power control.

FIG. 5 is a flow diagram for power control to enable power control and savings in a data center environment. The flow 500 begins with the inclusion of one or more batteries 510. The batteries 510 can include any type of battery and storage cell technology including lead-acid batteries, gel-cell batteries, sealed batteries, deep-cycle batteries, lithium-ion batteries, nickel-cadmium batteries, nickel-metal hydride batteries, etc. In some embodiments, the batteries 510 are so-called "smart batteries" that include capabilities in addition to charge storage such as an internal voltage monitoring circuit, an internal temperature monitoring circuit, an internal current limiting circuit, etc. The flow continues with the inclusion of one or more power supplies 520. Any power supply appropriate to the power needs of a datacenter can be used including DC power supplies and AC power supplies. The power supplies can include a switch-mode power supply. The power supplies can include other varieties of power supplies such as a programmable power supply, an uninterruptable power supply, and so on. One or more of the power supplies can be smart power supplies. The smart power supplies can include additional capabilities such as the ability to report power supply parameters including output voltage, operating temperature, duration of operation (e.g. usage hours), and health status. The flow continues with the inclusion of a plurality of connectors 530. The connectors can couple the one or more batteries 510 to one or more power loads, can couple the one or more power supplies 520 to the one or more loads, can connect the one or more batteries 510 to the one or more power supplies 520, and so on. One or more connectors can be coupled to the one or more power loads.

The flow continues with the use of a plurality of power sensors 540. The power sensors can be used to monitor various status parameters of the one or more batteries 510, and to monitor various status parameters of the one or more power supplies 520. In embodiments, the power sensors that monitor the batteries and the power sensors that monitor the power supplies can be networked. The flow 500 continues with the use of a plurality of load sensors 550. The load sensors can be used to monitor various parameters of the one or more power loads. The power load parameters can include DC power load, instantaneous DC power load, AC power load, instantaneous AC power load, and so on.

The flow 500 continues by providing control 560. The control can be provided using one or more controllers, where the controllers can include computers, microcomputers, microprocessors, microcontrollers, and so on. The one or more controllers can use the plurality of connectors to interconnect the one or more batteries, the one or more power supplies, and the one or more sensors for the purposes of control. The one or more controllers can be configured to distribute power from the one or more batteries 510 and the one or more power supplies 520 to multiple power loads contained within the one or more racks of IT equipment in an IT data center, for example. The control of the distribution of power by the controllers to the various loads can be based on dynamic load conditions of the loads. The controllers can be configured to detect changes in power load requirements including dynamic changes in power load requirements based on data from the one or more power sensors 540. The controllers can respond to other data from the power sensors such as failure conditions including, but not limited to, sensor failures, battery failures, excessive loads, and power supply failures. The sensor data can be used by the one or more controllers to detect failures of other controllers. When a controller failure is detected, the remaining controllers can invoke a failure policy based on the detection. In some embodiments, the failure policy includes disabling a power supply, disabling a load, and/or reallocating control of the power supplies to other controllers. The flow 500 can include analyzing network connectivity for the one or more batteries, the one or more power supplies, the plurality of power sensors, the plurality of load sensors, and the one or more controllers. Diagnostic and status reporting can be accomplished by sending messages via a networked host or a networked router. The messages can be routed to other monitoring equipment and/or to data center personnel.

The flow 500 can include a method for power control comprising: using one or more batteries 510; one or more power supplies 520; a plurality of connectors 530 between the one or more batteries and the one or more power supplies where the connectors provide power to one or more loads; a plurality of power sensors 540; a plurality of load sensors 550; and one or more controllers where the controllers control the one or more batteries and the one or more power supplies. The controllers can be responsive to the plurality of power sensors and the plurality of load sensors and enable the one or more batteries and the one or more power supplies to provide adequate power to the one or more loads to meet load requirements, and wherein the one or more batteries are configured to handle spikes in power demand by the one or more loads during a duration where the one or more power supplies do not provide sufficient power. Various steps in the flow 500 may be changed in order, repeated, omitted, or the like without departing from the disclosed concepts. Various embodiments of the flow 500 may be included in a computer program product embodied in a non-transitory computer readable medium that includes code executable by one or more processors.

Figure 6:
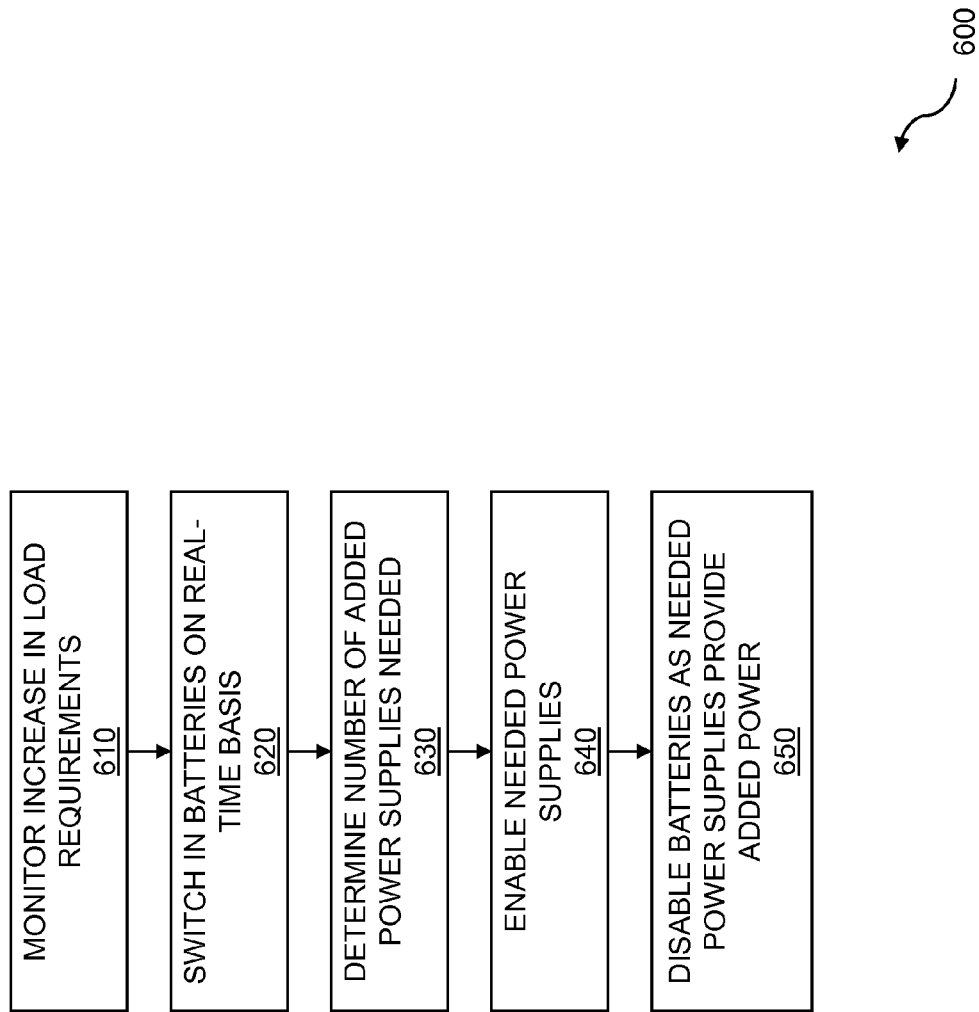
FIG. 6 shows an example of battery and power supply enablement to provide dynamic power.

FIG. 6 shows an example of battery and power supply enablement to provide dynamic power. The flow 600 begins with monitoring an increase in power load requirements 610. The increase in power load requirements can be determined through the use of sensors, for example, as described above. The increase in power load requirements can include dynamic increases in power load requirements. In embodiments, increases in power load requirements can be predicted based on the types of operations to be preformed by IT equipment. The flow 600 continues with switching in batteries on a real-time basis 620. The batteries can be enabled in real-time, on an interim basis, to provide additional power to meet increases in power load requirements. For example, the batteries can provide power to the loads for a given time period until additional power from power supplies becomes available. The time period can be based on power-supply response time, user-defined, based on a battery usage policy, based on a default time value, and so on. The flow 600 continues with determining a number of added power supplies needed 630. The number of power supplies needed to meet the increased power load requirements can be determined by one or more controllers, for example, as described above. The controllers can be used to evaluate the increased power requirements of the loads and to select a number of power supplies that can be enabled to meet the increased power requirements. The controllers can also be used to decouple the one or more batteries that were coupled to the loads once the one or more power supplies come online and sufficiently provide the needed power to the loads. In embodiments, the power load requirement determination is made by querying load sensors to determine an instantaneous power load requirement of the various power loads. A difference between the instantaneous power load requirement and the current power output of enabled power supplies can be computed by a controller, for example. The computed power difference can be used to determine a supplementary amount of additional power needed. Once the supplementary power need is determined, a measurement or determination of the amount of power available per additional power supply can be used to determine how many additional power supplies can be needed to meet the increased power requirement. In embodiments, the controller maintains a capabilities database in non-volatile storage such that the power capabilities and ratings of both online and offline power supplies are accessible from the database without needing to query the power supplies directly each time an adjustment in available power is required. For example, the power supplies can be queried upon initialization to determine capabilities such that they do not need to be queried prior to a power adjustment. The flow 600 continues with the enabling needed power supplies 640. The needed power supplies can be powered up and can be given an appropriate amount of time to attain a stable operating point. The amount of time needed to attain a stable operating point for a power supply can be determined by measuring the output of the power supply, can be user-defined, can be a default value, and so on. The flow 600 then continues with the disabling batteries as needed power supplies provide added power 650. The batteries that are disabled can be from among the batteries that were previously switched in 620. The one or more batteries that were previously switched in can be disabled (e.g. disconnected from the one or more loads) one battery at a time, can be disabled in groups, can be disabled all at once, and so on. Various steps in the flow 600 may be changed in order, repeated, omitted, or the like without departing from the disclosed concepts. Various embodiments of the flow 600 may be included in a computer program product embodied in a non-transitory computer readable medium that includes code executable by one or more processors.

Figure 7:
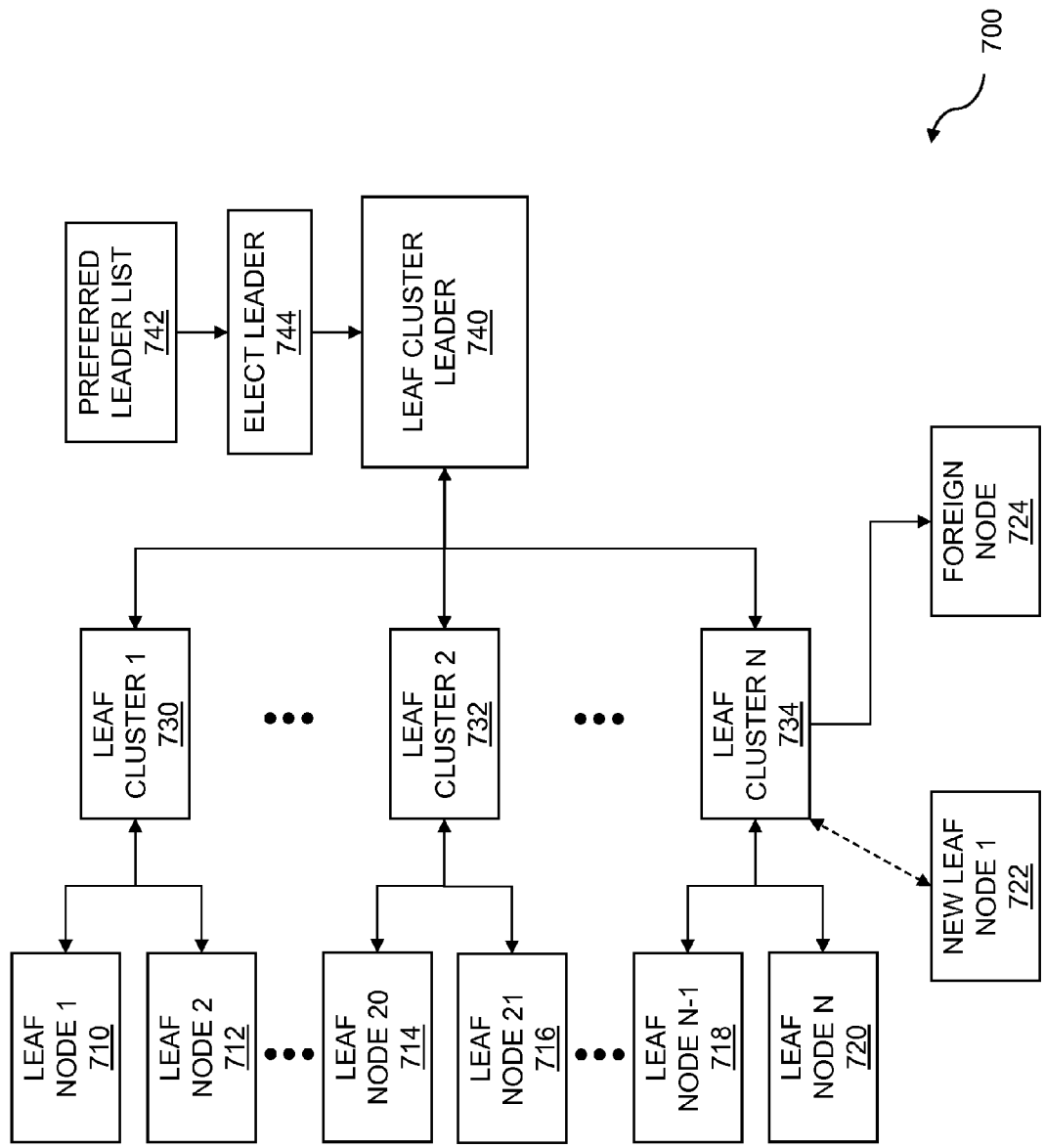
FIG. 7 is a system diagram for leaf node hierarchy in power control.

FIG. 7 is a system diagram for leaf node hierarchy in power control. Node and cluster concepts can be used as part of the elastic power allocation and control methods. The system 700 includes a plurality of leaf nodes where each leaf node comprises a Power Control Compute Node (PCCN) including one or more power sources and where each node is a node of a power control network. The system 700 also includes a leaf cluster formed from the plurality of leaf nodes where the leaf cluster forms a private network and where the leaf cluster is self-organizing. A plurality of leaf clusters (for example, leaf clusters 730, 732, and 734) can be present in the system 700. Each leaf cluster comprises a plurality of leaf nodes. For example, in the system shown, the leaf cluster 730 comprises a leaf node 710 and another leaf node 712, the leaf cluster 732 comprises a leaf node 714 and another leaf node 716, and the leaf cluster 734 comprises a leaf node 718 and another leaf node 720. The leaf cluster can be configured to provide localized intelligent power control decisions.

The flow 700 includes a leader 740 for the leaf cluster where the leader is elected from amongst the plurality of leaf nodes and where the leader communicates with a next-higher level of hierarchy in power control. Hence, amongst all the leaf nodes, a process is performed to elect a leader 744. The leaf cluster leader 740 can enforce power control policies within the leaf cluster. The system 700 can further include a preferred list of leaders 742 within the plurality of leaf nodes based on capabilities of each of the plurality of leaf nodes. The leader 740 can be elected from the preferred list of leaders. The preferred list of leaders can include a subset of the leaf nodes that are eligible to become the leader in the event of a failure of the current leader or the current leader being shut down for maintenance.

The capabilities of each of the plurality of leaf nodes can be broadcasted during an election process. In embodiments, each leaf node reports its capabilities and status to a master node. The capabilities can include, but are not limited to, number of processors, processor speed, memory size, operating system, and communication interface speeds. The status can include, but is not limited to, current operating hours (up time), total operating hours, current temperature, fan speed, fan health, manufacture date, battery levels, and/or voltage ripple. The temperature, fan speed, fan health, and other status information can be combined into an overall health score H, where a higher health score indicates a healthier node. Based on this information, a node can generate a preferred list of leaders utilizing an algorithm to generate a score for each node, and thus, a rank for each node. The highest-ranking nodes can be stored in a preferred leader list based on the score. The score can be based on a function of both the capabilities and status of a node. In embodiments, a score S can be computed as:

$$S = K1(N) + K2(M) + K3(X-A) + K4(H)$$

In the above equation, K1, K2, K3, and K4 are constants, N is the number of processors, M is the memory size (e.g. in gigabytes), X is a constant, and A is the age (e.g. in days) of the node (based on manufacture date), and H is the health score. The constants are selected to give the appropriate weighting to each aspect of the score. For example, health status (based on fan speed, operating temperatures, etc.) might be deemed more important than the age of the node, thus K4 will be greater than K3 in some embodiments.

In some embodiments, the election process begins at the request of any member node by sending out a multicast message as follows to the private cluster network's Election Multicast Address:

{'msg_id': MC_BEGIN_ELECTION_MSG}

An active election can be called off by a node if the node multicasts out:

{'msg_id': MC_END_ELECTION_MSG}.

In embodiments, at the receipt of a MC_BEGIN_ELECTION_MSG request in the multicast channel every Power Management Control Node (PMCN) sends out a list of its capabilities and characteristics for other PMCNs to evaluate. The list can include the following information:

a. CPU type and average load
    b. Memory available
    c. Storage available
    d. Network interfaces, speed and capabilities such as 802.1Q (VLAN Trunk)
    e. MAC address
    f. IP address of the node at the level of the election
    g. Cluster hierarchy level {0, 1, . . . N} of the election
    h. Power block UUID
    i. Software/Firmware version
    j. Software state (Functional/Broken/etc.)
    k. Last known leader list
    l. List of sensor and actuators associated with measurement and control.
    m. List of other capabilities (e.g. GPS, camera, etc.)
    n. Administrative weight (Default=0)

In embodiments, the information as listed is used to derive a weighted score for each of the PMCNs. While a lightly loaded PMCN can have a relatively high weighted score, a PMCN with a heavy load and participation in active measurement and control of power converter systems can have a relatively low weighted score. Similarly, the 802.1Q capability of a network interface can affect the weighted score of a PMCN. For example, an Atom-based computer system would bring superior computational power than a Quark-based system, and thus an Atom-based PMCN would have an increased weighted score. In case of a tie, a MAC address or an IP address can be used as a tiebreaker. It is also possible for an administrator to assign a preferred weight to bump up the electability of a PMCN under certain circumstances (e.g. troubleshooting, testing, maintenance, and the like). As the elections are timed, any member not participating in the election within the specified time does not count as a participant. For instance, a member might be down at the start of an election or just booting up during the election process, thus disqualifying itself from participation. After such non-participatory nodes do come online, the nodes are considered as new node insertions. Once a PMCN has obtained all PMCN weights based on the receiving of information from all other PMCNs in the cluster, it immediately chooses the first, second, and even third leader and populates its leader list with the IP addresses of the chosen leaders. It then computes a checksum of the same list and sends out a multicast message such as the following message:

{'msg_id': MC_LEADER_CKSM, 'value': <Checksum computed>}.

The sending node then expects to receive the same message from all other nodes. Once each node has sent the same message to every other node within the private cluster network, the election is considered settled and the leader list is considered final. The first node in the list becomes the leader of the cluster. In embodiments, the checksum is an MD5 checksum.

A past leader, if present, immediately relinquishes its position as a leader if not chosen again in the election. If not reelected, the past leader also stops any processes associated with the leadership role. The same election process is carried out at every level in the hierarchy of the Computer System Tree Hierarchy (hereafter abbreviated CST). In embodiments, the presence of just one PMCN in a cluster election indicates the top of the hierarchy has been reached and no more elections can happen. However, a new multicast message indicating an election can reverse this state. At the highest level, the leader represents the CST itself.

The system 700 can further comprise a new member 722 within the leaf cluster where the new member is a PCCN. In embodiments, the new member 722 is included as a result of a hot plug operation. That is, the new member can be connected to the system while power is being supplied to the system, although the system can also be offline or in a standby state. Addition of the new member 722 can cause a new election for leadership within the leaf cluster. In embodiments, the simple insertion of a new PCCN/PMCN triggers a new election process. If the new PMCN's weight (score) is less than any of the leaders in the preferred leader list, no action is taken. But, if the new node happens to weigh more than (have a higher score than) any existing leader node, the positions on the preferred leader list are readjusted. If the leader list has the following weights: 84, 54, 45, and the new PMCN's weight is 65, the new weight order becomes 84, 65, 54, with nodes taking new positions based on the updated list of scores. On the other hand, if the new PMCN's weight is 90, the order becomes 90, 84, 54. The second situation leads to the active leader being ejected to immediately make the new PMCN the leader and relinquish the old leader to secondary status. In the case of a leader switch, control is given up by the old leader and is assumed by the new leader.

New telemetry from a new node within the power control network can be obtained as a result of a hot plug operation. In other embodiments, the new member 722 is added during runtime operation. In this case, not only is the system powered on, but it is also online and performing computations, and in the case of a data center also processing queries and responding to the queries at the time the node is swapped in.

The system 700 can further comprise a foreign node 724 wherein the foreign node is part of the power control network and where the foreign node responds to the leader of the leaf cluster. The foreign node 724 can be from a different manufacturer, a different brand, a different model, or a different location. It can be part of a legacy system and have reduced capabilities or be incompatible with certain aspects of the current system. However, the foreign node might still function in a limited capacity. The foreign node 724 can be part of a foreign cluster of nodes where the foreign cluster is part of the power control network.

Figure 8:
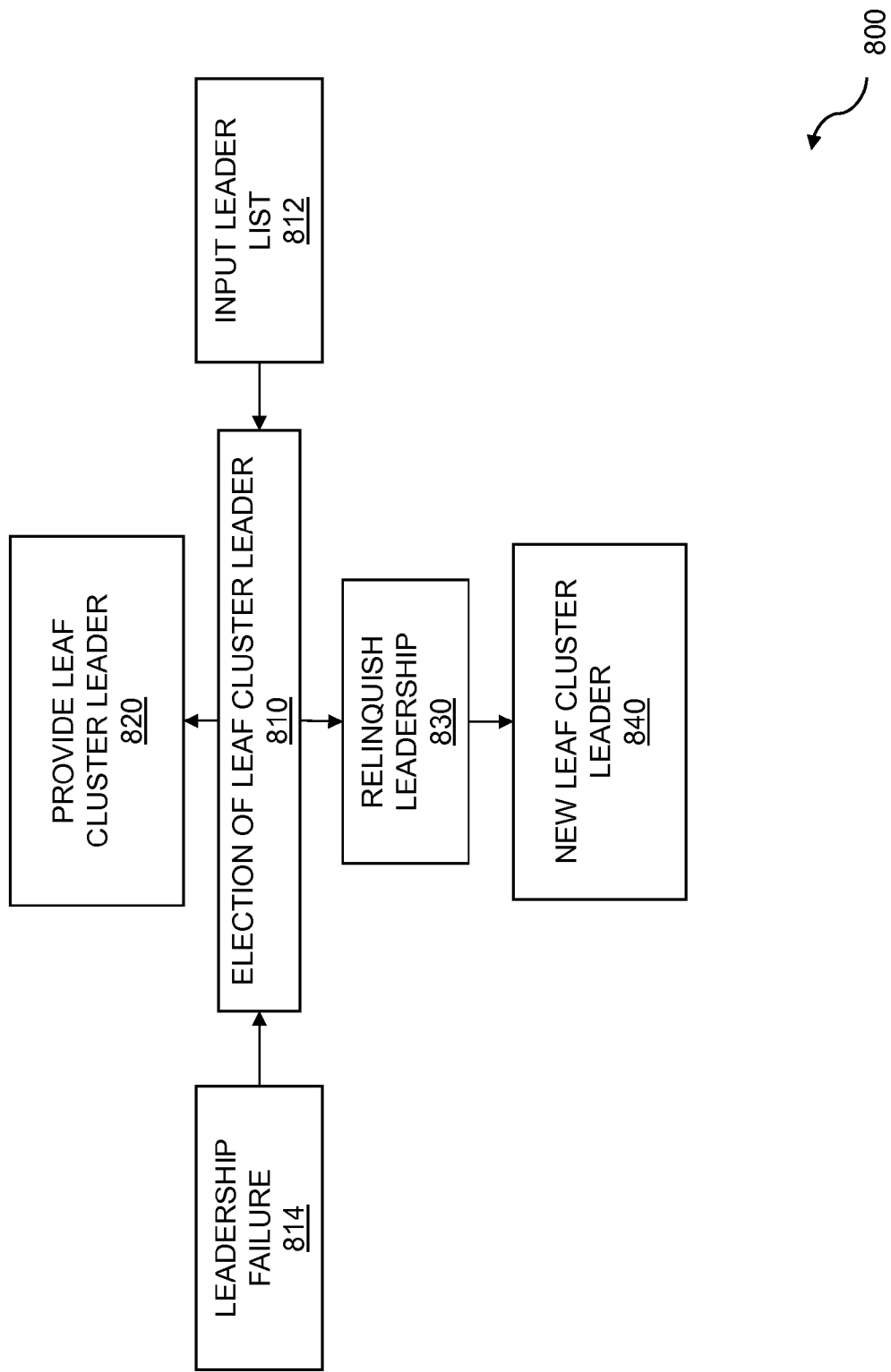
FIG. 8 is a flow diagram for an election process.

FIG. 8 is a flow diagram for an election process. The election process can aid in providing distributed power control across a data center. The flow 800 includes the election of a leaf cluster leader 810. The elected leader can be determined as part of a new election. A leader list can be input 812 to the process/procedure that performs an election to choose a new leaf cluster leader 820. As previously described, a master node can automatically generate the leader list. Additionally, leadership failure 814 can trigger an election process. In embodiments including the failure of a leader, a higher-level node performs an election process to determine a new leader. Each leader can periodically send heartbeat (keep alive) messages to a node in the hierarchy level above its own level. If the heartbeats cease (due to failure of the node, for example) the cessation serves as an indication to initiate an election process. For example, in a certain embodiment a heartbeat is sent every T seconds. In this embodiment, an election process is initiated if after T seconds the heartbeat is not received. T can be a value ranging from 2 seconds to 10 seconds or more. Furthermore, lack of telemetry from the leader can also cause the leader to be considered a failed leader and cause the leaf cluster to respond to a new leader. Telemetry can include data from sensors or other sources such as temperature data, fan data, battery data, voltage and current data, and other relevant parameters.

In the embodiment detailed above in which a failed leader is identified by non-existent (missing) heartbeats or telemetry acknowledgements for a specific period, the other members (nodes) immediately switch to the next leader in line based on a preferred leader list. In embodiments, the next leader has already set up its network for communication with the higher cluster network and can send out a MC_PRESENT_MSG to the higher network, thereby establishing itself as the new representative for the lower cluster. If there are no more leaders left after a leader failure, the nodes either try to contact the next leader again in a round robin format or begin a new leader election process from among the available PMCNs.

The flow 800 can further comprise recognizing a new leader for the leaf cluster 840 as a result of the new election. As mentioned before, in the case of leadership failure 814 a new leader is elected. Additionally, in the case of a new node being added to the system, then a new election can also be triggered. However, in the case of a new node, the new election might or might not result in a new leader. For example, if the newly added member has capabilities that are less than the current leader, then the current leader node remains as leader. If however, the newly added member has increased capabilities (e.g. more processors and/or more memory), then the newly added member can become the leader as a result of the election. In such a situation, the current leader relinquishes the leader role, though the displaced leader can still function as a power control compute node (PCCN). The new member can be included as a result of a hot plug operation. The new member can be included during runtime operation.

The flow 800 can include a situation where the current leader relinquishes leadership 830 to the new leader within the leaf cluster. The new leader can take over role responsibilities from the former leader. The relinquishing can include a handoff sequence between the current leader and the new leader. The handoff sequence can include the current leader transmitting status information to the new leader. The status information can include, but is not limited to, the number of nodes under control of the current leader, the address of each of the nodes, and other data and/or metadata about each node, including the score S for each node. The new leader can then transmit a NEW LEADER message to each node under control of the current leader. In embodiments, the NEW LEADER message contains the address of the new leader. Each node under control of the current leader then updates its configuration, such that future telemetry data from each node is now transmitted to the new leader. Metadata within the leaf cluster can be obtained on a dynamic basis.

In embodiments, the PMCN chosen as leader first self-configures a new (virtual or real LAN) interface to predetermined external network settings. For instance, the configuration can include creating a VLAN interface on an Ethernet interface and assigning a network address to communicate with an outside network on the same VLAN and subnet. Upon making the interface available, the PMCN sends out an "I am present" message to any peers in the network as a way of announcing its presence. In doing so, it also sends out the unique ID of the lower-level cluster it represents. For example, a concatenation of all power block Universally Unique Identifiers (UUIDs) can form the cluster ID of a leaf cluster and be broadcast by the group leader within a higher-level cluster. At minimum, the presence message multicast in the higher-level cluster can appear in the following format:

{'msg_id': MC_PRESENT_MSG, 'value':<cluster ID>}.

Note that this message is only intended for the higher order cluster network and not meant for the leader's cluster. This message helps other members in the higher order cluster register this PMCN at the peer level as a member and keep count of the total members.

The second and third leaders in a cluster leader list can also begin self-configuring a new (virtual or real LAN) interface to predetermined external network settings similar to the leader. However the nodes neither send the MC_PRESENT_MSG to the higher cluster nor begin the leader process, instead remaining standby leaders.

All leaf cluster PMCNs send measurement reports to the leader of their leaf cluster. The leaf cluster leader is thus responsible for processing the accumulated data and enforcing right sizing and other policies. The leader registers itself to the higher layer after the MC_PRESENCE_MSG and obtains the policy configurations from the leader at the higher level. Leader nodes at every hierarchy level contain the policies pertinent to the nodes under them. The telemetry data collection is also performed hierarchically, then accumulated and sent out to the next level. Further report filtering and frequency adjustment is possible at every level.

At the highest level, the leader which represents the CST itself is usually responsible for providing API support, admin web UI, etc. for external entities such as a third-party application, an administrator, or a CLI script. This highest level is usually the enterprise network and does not necessarily feature the private networks that characterize the CST's lower-level clusters. In embodiments, the highest-level leader will both be exposed to an enterprise network and able to note the lack of election process at its level. These two factors can signal the highest-level leader to begin the manager process. The manager process can include connecting to a configuration database and using information from the database to apply policies to lower-level PMCNs. The lower-level PMCNs in turn propagate the policies to still lower levels. The policies eventually reach the power blocks at the leaf clusters where they are enforced.

Returning to a discussion of new leaf cluster leader election 840 at the node-cluster level, a new leader can be pre-calculated during a previous election as a secondary leader. In embodiments, the preferred leader list can comprise a plurality of ranked nodes. Each node can be in a succession order to become the new leader in the event of an election. For example, the preferred leader list can comprise three power control compute nodes, PCCN1, PCCN2, and PCCN3. In this embodiment PCCN1 is next in line to be leader if any failure occurs with the current leader. Following this example, if node PCCN1 fails then node PCCN2 is next in line to be leader.

In embodiments, the preferred leader list can be updated using a leader list evaluation process (LLEP). The LLEP is similar to a leader election, but pertains to maintenance of the preferred leader list. For example, referring again to the previously mentioned exemplary preferred leader list containing nodes PCCN1, PCCN2, and PCCN3, if a new member node PCCN4 is introduced into the system (e.g. via a hot plug event), then an election process can be triggered. In the event that the current leader is more capable then the new node, a full election process does not initiate—i.e. the current leader remains as leader. However, the leader list evaluation process (LLEP) can still execute, and if it is determined that, for example, node PCCN4 is more capable than node PCCN1, then the preferred leader list can be updated to reflect the newly discovered capacities and will read as follows: PCCN4, PCCN1, and PCCN2, where PCCN4 is now the new "next in line" power control compute node in the event of a failure of the current leader node. Thus, even if the leader does not change as the result of adding a new node, the preferred leader list can be updated based on the event.

Additionally, the preferred leader list can be updated based on the removal or failure of a PCCN. Referring again to the previously mentioned exemplary preferred leader list with nodes PCCN1, PCCN2, and PCCN3, if PCCN2 fails or is removed, then a LLEP can be performed to generate a new preferred leader list. In such a case, the new preferred leader list can comprise PCCN1, PCCN3, and PCCN4, where PCCN3 is now third in line to become the leader node and PCCN4, which has been newly added to the list, is fourth in line to become the leader node, thus maintaining three eligible nodes in the preferred leader list. Various steps in the flow 800 may be changed in order, repeated, omitted, or the like without departing from the disclosed concepts. Various embodiments of the flow 800 may be included in a computer program product embodied in a non-transitory computer readable medium that includes code executable by one or more processors.

Figure 9:
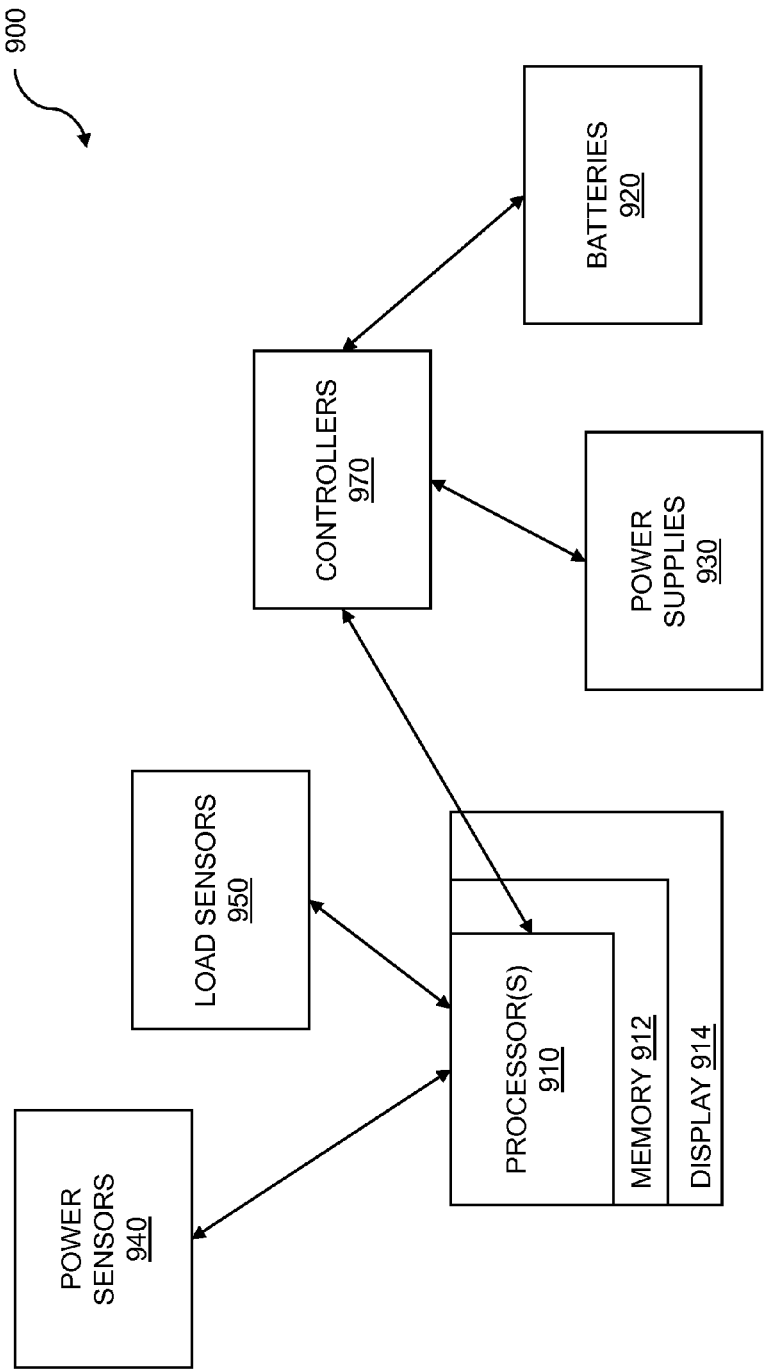
FIG. 9 shows a power control system.

FIG. 9 shows a power control system 900 that can provide for elastic power control. The power control system 900 can include one or more processors 910 and a memory 912 which stores instructions. The memory 912 is coupled to the one or more processors 910 wherein the one or more processors 910 can execute instructions stored in the memory 912. The memory 912 can be used for storing instructions, for storing databases of power supplies, for storing information pertaining to load requirements, for storing information pertaining to redundancy requirements, for storing failure policies, for system support, and the like. Information about the various designs can be shown on a display 914 connected to the one or more processors 910. The display can comprise a television monitor, a projector, a computer monitor (including a laptop screen, a tablet screen, a net book screen, and the like), a cell phone display, a mobile device, or another electronic display.

The power control system 900 can further include one or more controllers 970 configured to communicate with the one or more processors 910, one or more power supplies 930, and one or more batteries 920. A plurality of power sensors 940 and load sensors 950 are configured and disposed to provide data to the one or more processors 910. In embodiments, the plurality of sensors 940 monitors voltage, current, and temperature. A detection can be performed, using the plurality of power sensors, that determines that one or more of the plurality of sensors is faulty. In embodiments, the detection is performed by employing redundant sensors and treating a sensor reading far outside the range of the other sensors as faulty. For example, if three temperature sensors are used in a redundant manner, e.g. all three sensors are monitoring temperature in the same physical area, and a first temperature sensor reads 104 degrees Fahrenheit, a second sensor reads 106 degrees Fahrenheit, and a third sensor reads 55 degrees Fahrenheit, the controller can identify the third sensor as faulty. The controllers can invoke a failure policy based on the detection. In embodiments, the failure policy includes sending a diagnostic message and/or posting an alert identifying the faulty sensor.

The system 900 can include a computer program product embodied in a non-transitory computer readable medium for power control comprising: code for controlling a controller; one or more batteries; one or more power supplies; a plurality of connectors, between the one or more batteries and the one or more power supplies where the connectors provide power to one or more loads; a plurality of power sensors; a plurality of load sensors; and one or more controllers where the controllers control the one or more batteries and the one or more power supplies and where the controllers are responsive to the plurality of power sensors and the plurality of load sensors and enable the one or more batteries and the one or more power supplies to provide adequate power to the one or more loads and to meet load requirements, and wherein the one or more batteries are configured to handle spikes in power demand by the one or more loads during a duration where the one or more power supplies do not provide sufficient power.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. An apparatus for power control comprising:
   one or more batteries;
   one or more power supplies;
   one or more DC-to-AC converters;
   a plurality of connectors between the one or more batteries and the one or more power supplies where connectors provide DC power to the one or more DC-to-AC converters, wherein the DC-to-AC converters provide power to one or more AC loads;
   a plurality of power sensors coupled to the one or more batteries and the one or more power supplies;
   a plurality of load sensors coupled to the one or more AC loads; and
   one or more controllers that control the one or more batteries and the one or more power supplies, where the one or more controllers are responsive to the plurality of power sensors and the plurality of load sensors, and enables the one or more batteries and the one or more power supplies to provide adequate power to the one or more DC-to-AC converters to meet load requirements, and wherein the one or more batteries are configured to handle spikes in power demand by the one or more AC loads with the one or more DC-to-AC converters during a duration where the one or more power supplies do not provide sufficient power.

2. The apparatus of claim 1 wherein the duration, where the one or more power supplies do not provide sufficient power, is a time duration during which the one or more controllers trigger the one or more power supplies to provide more power.

3. The apparatus of claim 2 wherein the duration is determined based on dynamic power requirements.

4. The apparatus of claim 1 wherein the one or more controllers are configured, in event of a failure in one of the one or more controllers, such that a power source is coupled to the AC load.

5. The apparatus of claim 1 wherein, upon failure of a controller, control of the one or more batteries and the one or more power supplies is transferred to a second controller.

6. The apparatus of claim 1 wherein the one or more controllers comprise a plurality of controllers and the plurality of controllers provide for redundancy of operation within the plurality of controllers so that the one or more batteries and the one or more power supplies continue to provide adequate power to the one or more AC loads.

7. The apparatus of claim 1 wherein the one or more controllers are configured, upon startup, such that the one or more controllers enter a default mode.

8. The apparatus of claim 1 further comprising a module that determines capabilities of the one or more power supplies.

9. The apparatus of claim 1 further comprising a module that determines power requirements for the one or more AC loads.

10. The apparatus of claim 1 wherein the one or more batteries, the one or more power supplies, the plurality of connectors, the plurality of power sensors, the plurality of load sensors, and the one or more controllers comprise a consolidated rack mount power system.

11. The apparatus of claim 10 wherein the one or more batteries, the one or more power supplies, the plurality of connectors, the plurality of power sensors, the plurality of load sensors, and the one or more controllers comprise a consolidated side mount power system.

12. The apparatus of claim 11 wherein the consolidated rack mount power system and the consolidated side mount power system are stackable.

13. The apparatus of claim 12 wherein stacking provides for N+ parallelization.

14. The apparatus of claim 12 wherein stacking provides for 2N parallelization.

15. The apparatus of claim 11 wherein the consolidated side mount power system provides power across multiple racks.

16. The apparatus of claim 10 wherein the one or more controllers couple power sources, from the one or more batteries, the one or more power supplies, and the one or more DC-to-AC converters to the one or more AC loads, based on power redundancy requirements of the one or more AC loads.

17. The apparatus of claim 16 wherein the power redundancy requirements are automatically detected based on information obtained from the plurality of power sensors, the plurality of load sensors, the one or more power supplies, and the one or more batteries.

18. The apparatus of claim 1 wherein the one or more controllers perform a detection, using the plurality of power sensors, that voltage readings from a plurality of power supplies differ in excess of a certain threshold number from a specified voltage.

19. The apparatus of claim 1 wherein the one or more controllers perform a detection, using the plurality of power sensors, that current readings from a plurality of power supplies differ in excess of a certain threshold number from a specified current.

20. The apparatus of claim 1 wherein the one or more controllers perform a detection, using the plurality of power sensors, that determines that certain of the one or more power supplies is not controllable by one of the one or more controllers.

21. The apparatus of claim 1 wherein the one or more controllers perform a detection, using the plurality of power sensors, which determines that certain batteries of the one or more batteries are at a low voltage.

22. The apparatus of claim 1 wherein the one or more controllers evaluate possible power capabilities of the one or more power supplies and power requirements of the one or more AC loads, determine that power requirements of the one or more AC loads exceed power capabilities of the one or more power supplies, and couple the one or more batteries to the AC load through the DC-to-AC converter to supply additionally needed power.

23. The apparatus of claim 1 wherein the one or more controllers evaluate power requirements of the one or more AC loads and decouple the one or more batteries based on the one or more power supplies sufficiently providing needed power to the one or more AC loads.

24. The apparatus of claim 1 performs a detection, using the plurality of power sensors, which determines one or more of the plurality of power sensors is faulty.

25. The apparatus of claim 24 wherein the one or more controllers invoke a failure policy based on the detection.

26. The apparatus of claim 1 wherein the one or more power supplies provides a substantially 12-volt DC power.

27. The apparatus of claim 1 wherein the one or more batteries, the one or more power supplies, the one or more DC-to-AC converters, the plurality of connectors, the plurality of power sensors, the plurality of load sensors, and the one or more controllers are housed in a 1U enclosure and mounted in a rack.

28. The apparatus of claim 1 wherein the one or more controllers are housed separately from the one or more batteries and the one or more power supplies.

29. The apparatus of claim 1 wherein the one or more batteries, the one or more power supplies, the one or more DC-to-AC converters, the plurality of connectors, the plurality of power sensors, the plurality of load sensors, and the one or more controllers provide power for a data center rack.

30. The apparatus of claim 1 further comprising network connectivity for the one or more power supplies, the plurality of power sensors, the plurality of load sensors, or the one or more controllers.

31. The apparatus of claim 1 wherein the one or more batteries; the one or more power supplies; the one or more DC-to-AC converters: the plurality of connectors between the one or more batteries and the one or more power supplies; the plurality of power sensors coupled to the one or more batteries and the one or more power supplies; the plurality of load sensors coupled to the one or more AC loads; and the one or more controllers comprise a leaf with a plurality of leaf nodes where each leaf node comprises a power control compute node including one or more power sources where each node is a node of a power control network;
  a leaf cluster formed from the plurality of leaf nodes where the leaf cluster forms a private network and where the leaf cluster is self-organizing; and
  a leader for the leaf cluster where the leader is elected from amongst the plurality of leaf nodes and where the leader communicates with a next higher level of hierarchy in power control.

32. The apparatus of claim 31 wherein the leaf cluster is configured to provide localized intelligent power control decisions.

33. The apparatus of claim 32 further comprising multiple levels of hierarchy in power control.

34. The apparatus of claim 31 further comprising a preferred list of leaders within the plurality of leaf nodes based on capabilities of each of the plurality of leaf nodes.

35. A method for power control comprising:
  providing one or more batteries; one or more power supplies; one or more DC-to-AC converters; a plurality of connectors, between the one or more batteries and the one or more power supplies where connectors provide DC power to the one or more DC-to-AC converters, wherein the DC-to-AC converters provide power to one or more AC loads; a plurality of power sensors coupled to the one or more batteries and the one or more power supplies; a plurality of load sensors coupled to the one or more AC loads; and one or more controllers;
  controlling, by the one or more controllers, the one or more batteries and the one or more power supplies responsive to the plurality of power sensors and the plurality of load sensors;
  enabling the one or more batteries and the one or more power supplies to provide adequate power to the one or more DC-to-AC converters to meet load requirements; and
  handling spikes in power demand by the one or more AC loads with the one or more DC-to-AC converters during a duration where the one or more power supplies do not provide sufficient power.

36. A computer program product embodied in a non-transitory computer readable medium for power control, which when provided with one or more batteries; one or more power supplies; one or more DC-to-AC converters; a plurality of connectors between the one or more batteries and the one or more power supplies, where connectors provide DC power to the one or more DC-to-AC converters, wherein the DC-to-AC converters provide power to one or more AC loads; a plurality of power sensors coupled to the one or more batteries and the one or more power supplies; a plurality of load sensors coupled to the one or more AC loads; and one or more controllers, causes the one or more controllers to perform operations comprising:
  controlling the one or more batteries and the one or more power supplies responsive to the plurality of power sensors and the plurality of load sensors;
  enabling the one or more batteries and the one or more power supplies to provide adequate power to the one or more DC-to-AC converters, to meet load requirements; and
  handling spikes in power demand by the one or more AC loads with the one or more DC-to-AC converters during a duration where the one or more power supplies do not provide sufficient power.

\* \* \* \* \*